Figure 3:
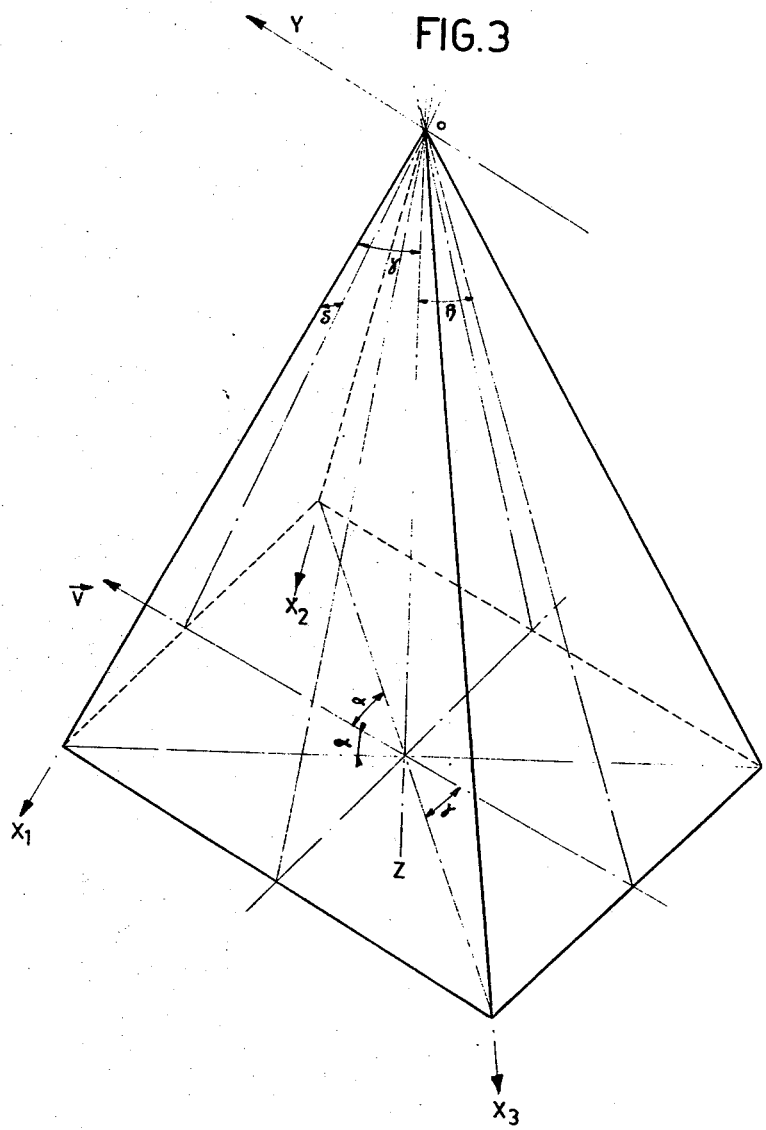

United States Patent [19]
Delignieres

[11] 3,754,207
[45] Aug. 21, 1973

[54] METHOD FOR DIRECTLY MEASURING THE DISTANCE TRAVELLED OVER BY A VEHICLE MOVING IN A WATER BODY, WITH RESPECT TO THE SUBMERGED GROUND SURFACE AND DEVICE THEREFOR

[75] Inventor: Robert Delignieres, Colombes, France

[73] Assignee: Institut Francais Du Petrole Des Carburants et Lubrifiants, Rueil-Malmaison, France

[22] Filed: June 22, 1970

[21] Appl. No.: 48,002

[52] U.S. Cl. ............................ 340/3 D, 343/8, 343/9
[51] Int. Cl. ................................................ G01s 9/66
[58] Field of Search ..................... 340/3 D; 343/8, 9

[56] References Cited
UNITED STATES PATENTS

| | | | |
|---|---|---|---|
| 3,436,721 | 4/1969 | Farr | 340/3 D |
| 3,617,995 | 11/1971 | Goulet | 340/3 D |
| 3,277,430 | 10/1966 | Hagemann | 340/3 D |
| 3,491,333 | 1/1970 | Goulet et al. | 340/3 D |
| 3,648,225 | 3/1972 | Reitz et al. | 340/3 D |

*Primary Examiner*—Samuel Feinberg
*Assistant Examiner*—N. Moskowitz
*Attorney*—Craig and Antonelli

[57] ABSTRACT

Navigation method making use of the DOPPLER effect, for measuring the distance travelled over by a vehicle in a water body with respect to the bottom thereof comprising transmitting intermittent acoustic signals towards said water bottom, receiving the signals diffused back therefrom, measuring during a time interval smaller than the duration of the received signals, the difference between the numbers of accrued cycles, respectively at the transmission frequency and at the receiving frequency and determining from said difference, in a binary digital form, the distance travelled over by the vehicle during a time interval equal to the recurrence period of the intermittent transmitted signals.

15 Claims, 15 Drawing Figures

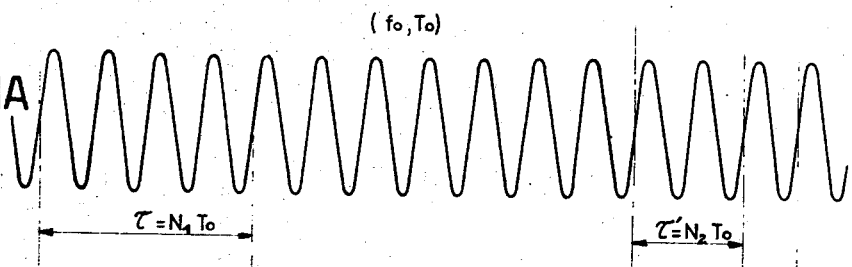
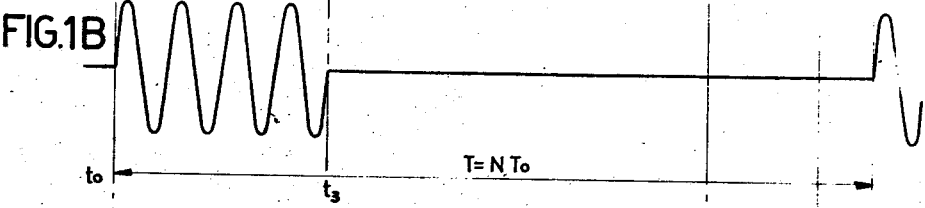
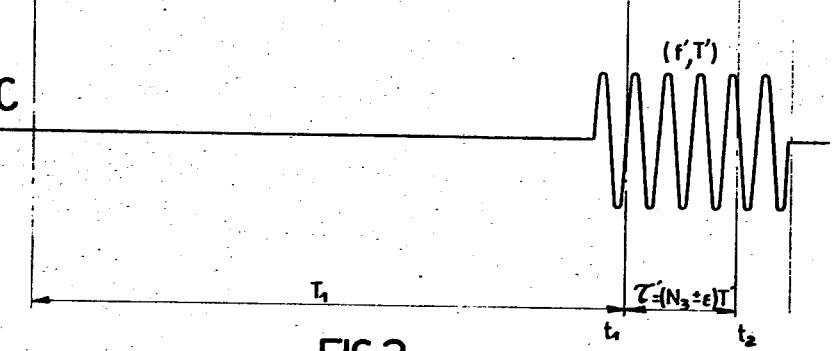
FIG.1A
FIG.1B
FIG.1C
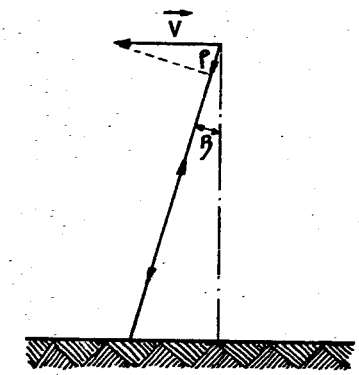
FIG.2

METHOD FOR DIRECTLY MEASURING THE DISTANCE TRAVELLED OVER BY A VEHICLE MOVING IN A WATER BODY, WITH RESPECT TO THE SUBMERGED GROUND SURFACE AND DEVICE THEREFOR

This invention relates to a navigation system of the DOPPLER type with discontinuous transmission, for measuring the distance travelled over by a vehicle in water or on the water surface, with respect to the submerged ground surface. Amongst the various methods used up to now for measuring the distance travelled over by a vehicle in water body or on the water surface are to be mentioned the LOCHS tachymeters comprising a helix, which directly measures the distance travelled over with respect to the water body, and also the LOCHS tachymeters operated by the pressure decrease, or the magnetic ones, which measure the relative velocity of the vehicle with respect to the water body. By integrating the velocity, the distance travelled over is determined.

More recent methods have been developed, making use of the well-known DOPPLER effect according to which the relative velocity of a vehicle is a function of the shift between the frequency of an acoustic wave transmitted from the vehicle and the frequency of the wave simultaneously received after reflection on an obstacle. One or more transmitting transducers continuously transmit ultra-sonic waves at a steady frequency to the immersed ground. One or more receiving transducers, optionally interconnected, receive the back-diffused ultra-sonic waves. These receivers are coupled to a device for detecting the difference between the frequency of the transmitted wave and that of the received wave and which indicates the velocity of the vehicle and the distance travelled over thereby.

These methods all suffer from a major drawback resulting from the continuous transmission. The receivers receive permanently a fraction of the incident waves directly from the transmitting transducers, which changes the spectrum of the received frequencies and makes false the measurement.

It is therefore an object of the present invention to provide a navigation method and device of the DOPPLER type whereby acoustic waves are transmitted in a discontinuous manner and which can be used on a vehicle which is displaced in a water body, so as to obtain directly the measurement of the distance travelled over and the travel direction with respect to the surface of the submerged ground, said device further providing a satisfactory compensation for the parasitic effect of the rolling the pitching, and the slope of the submerged ground surface.

Another object of the present invention is to provide a navigation device of the DOPPLER type for transmitting acoustic waves in a discontinuous manner at a steady frequency and to a long distance, whereby there can be measured, with a sufficient accuracy, the distance travelled over by a vehicle displaced in a water body, even at low velocities and over ground at small depth.

Still another object of the invention is to provide a device for digital treatment of the obtained signals, insensitive to parasitic voltages, avoiding analogical integrations which are always subjected to a drift effect.

The method of the invention consists of electrically generating wave trains at a steady frequency, transmitting said waves in the form of acoustic wave trains towards the surface of the submerged ground, along a predetermined inclined direction, receiving the ultrasonic wave trains after back-diffusion from the submerged ground surface, converting the received wave trains to electrical values, measuring, during a time interval $\tau'$ lower than the length of one of the received wave trains, the difference between the accrued number of cycles respectively at the transmission frequency and at the reception frequency and calculating, in a binary digital form, the distance travelled over during a time interval equal to the recurrence period $T$ of transmission of the wave trains.

This method will be performed, in particular, by means of a device, placed on the vehicle, whereby acoustic waves are transmitted in different oblique directions in order to determine the actual travel path of the vehicle with respect to the submerged ground.

The device, as used, essentially comprises a synchronizer, a transmission assembly including a modulator and a plurality of amplifying channels, transmitting transducers, receiving transducers, a reception assembly for demodulating, multiplying the frequencies and converting the received signals to pulses, a digital computer for determining the distance travelled over, said computer being fed with the received pulses and controlled through orders from the synchronizer, and an assembly for representing the distance travelled over, in the selected unit system with its magnitude and sign.

Figure 4:
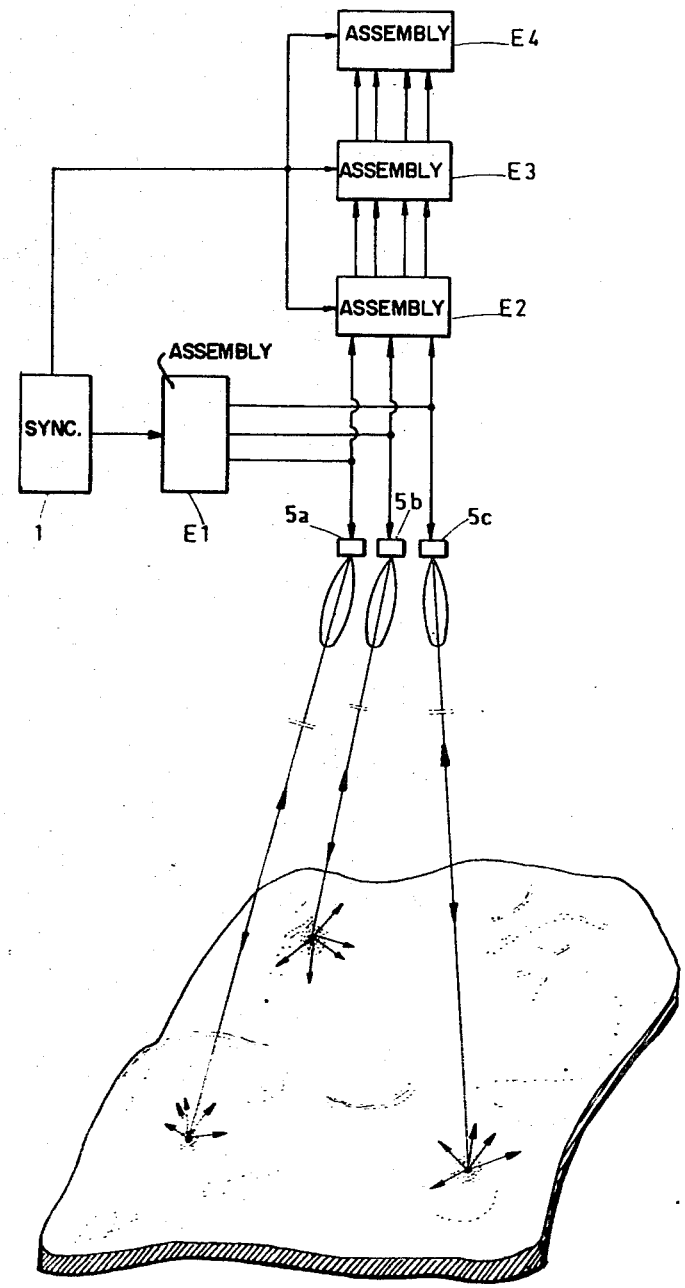
Figure 5:
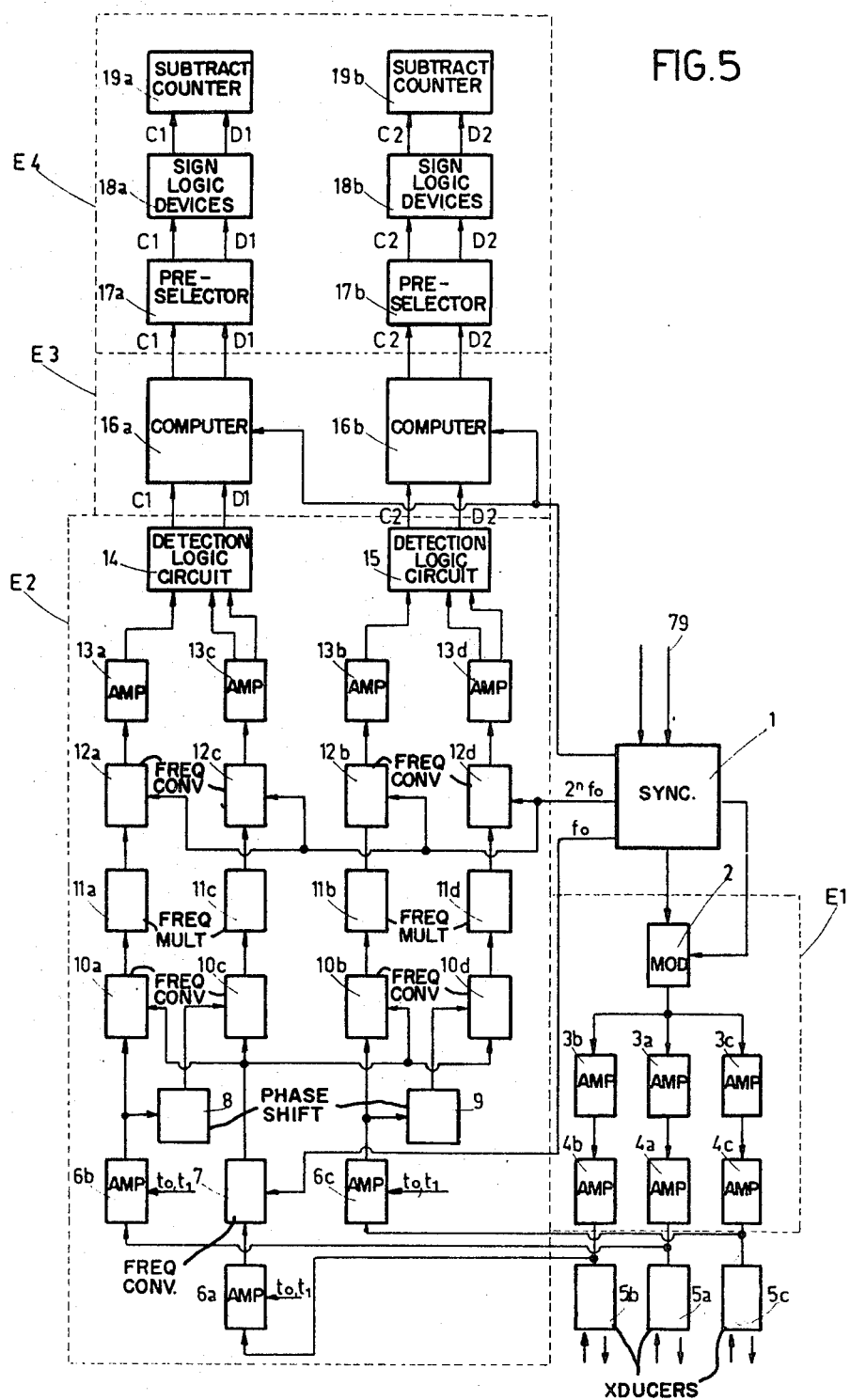
Figure 6:
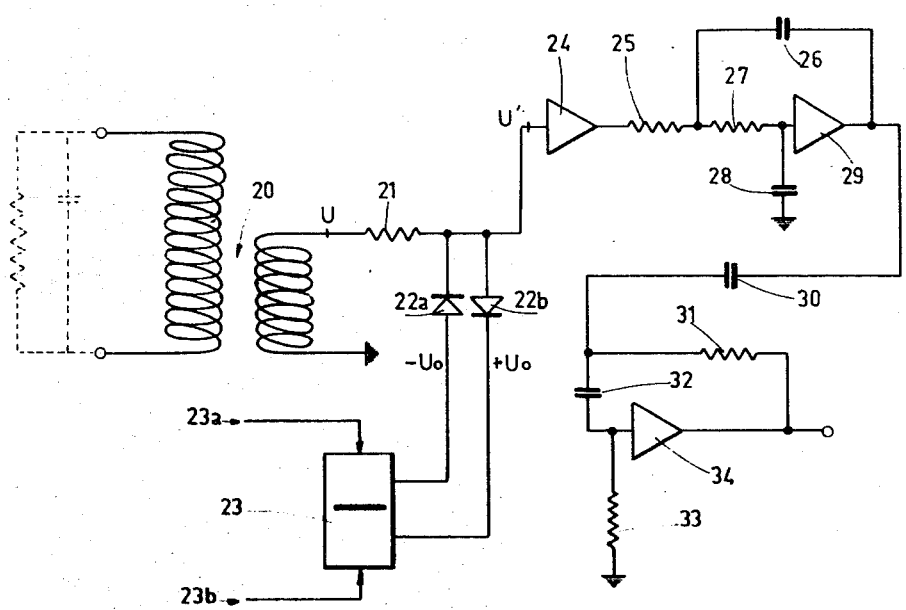
Figure 13:
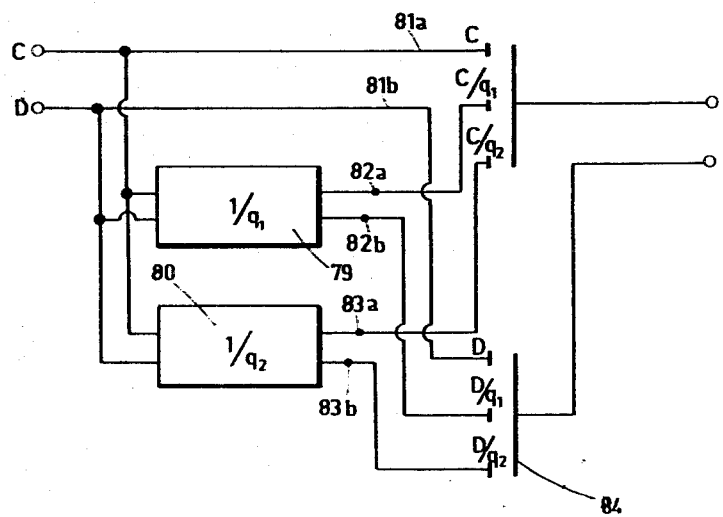
Figure 7:
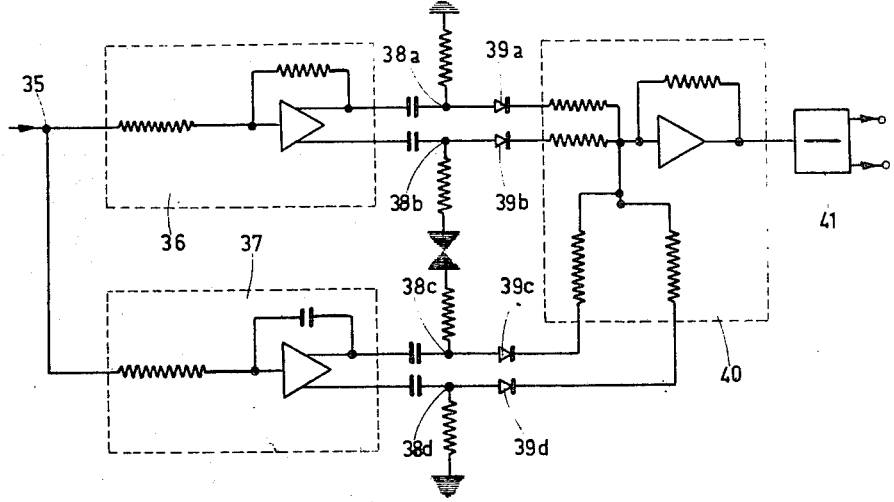
Figure 8:
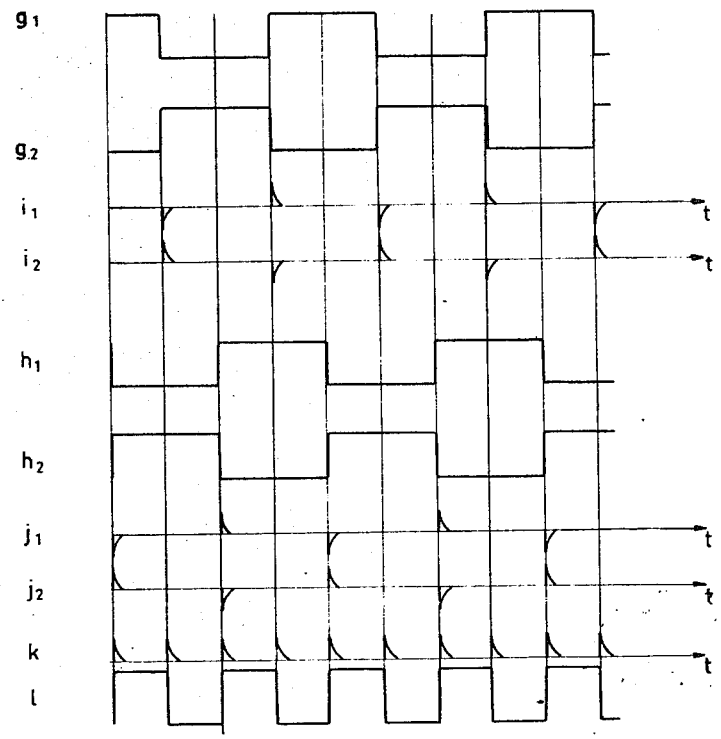
Figure 9:
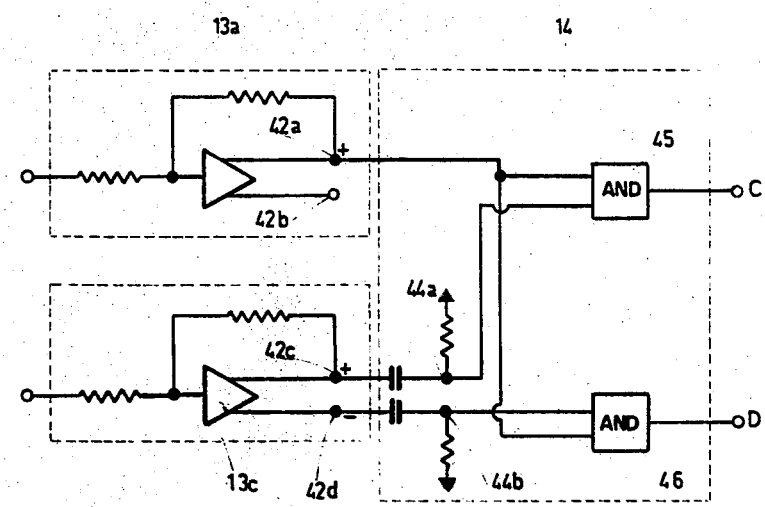
Figure 10:
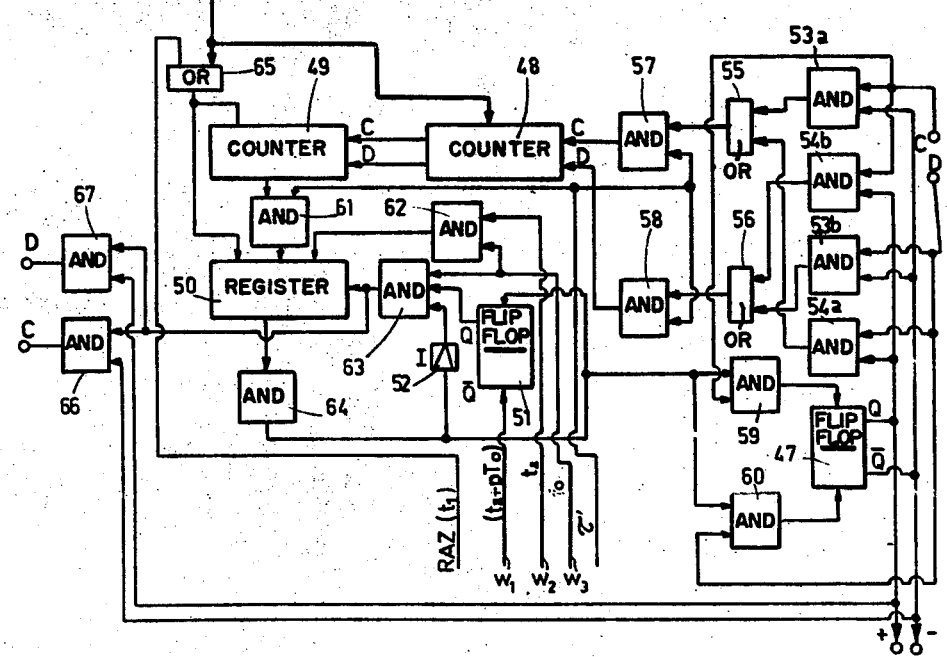
Figure 11:
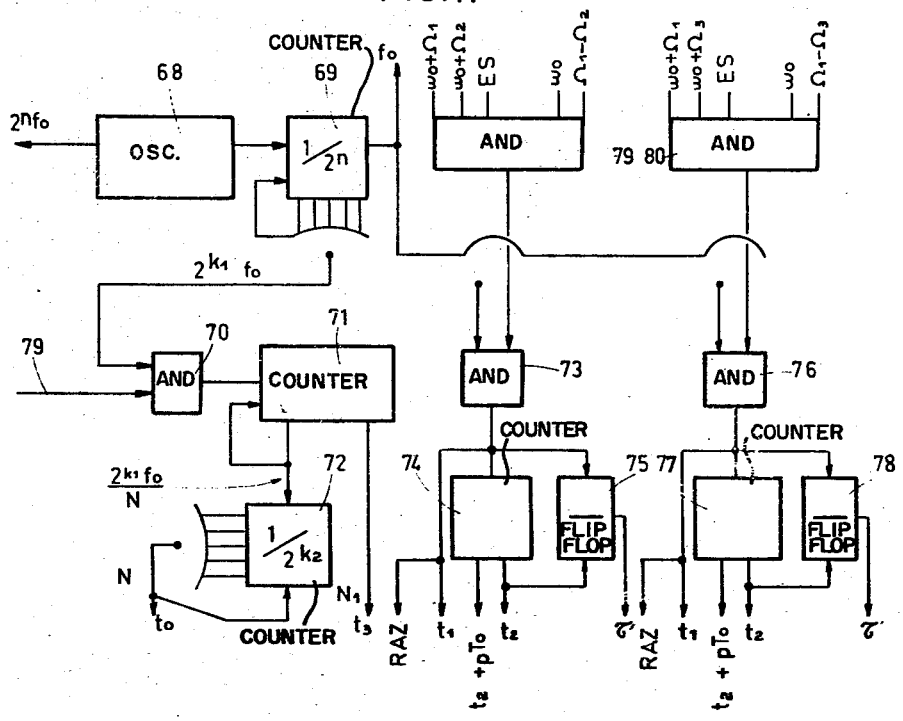
Figure 12:
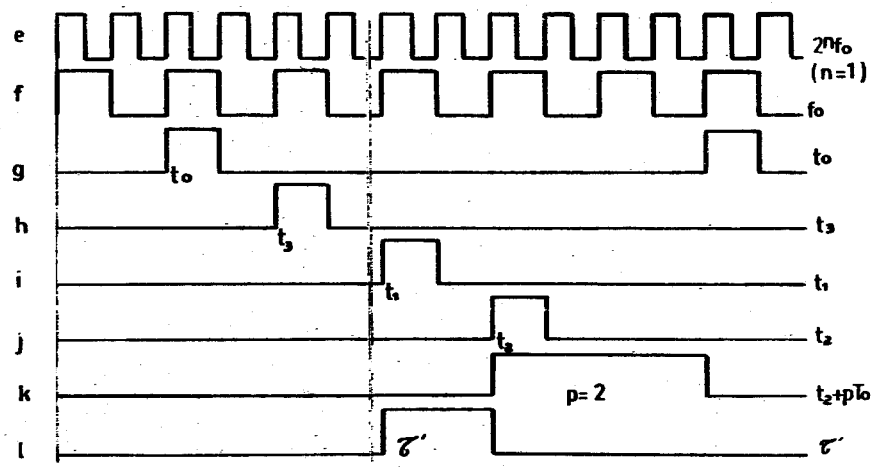

The method according to the invention and the device for performing the same will be further described with reference to the accompanying drawings wherein :

FIG. 1 A illustrates the oscillations generated by the synchronizer,

FIG. 1 B shows the distribution of the transmitted wave trains during time,

FIG. 1 C shows the distribution of the received wave trains during time,

FIG. 2 shows the position of the velocity vector with respect to a transmission axis selected, for illustrative purpose , in the longitudinal plane of the vehicle, FIG. 3 shows the position of the transmission and the reception axes in the device of the invention, FIG. 4 illustrates the connection of the different assemblies forming parts of the device, FIG. 5 is a synoptical diagram of the elements forming the different assemblies, FIG. 6 diagrammatically shows an input amplifier for the reception assembly, FIG. 7 diagrammatically shows a frequency multiplier of the type used in the device, FIG. 8 shows the shape of the electrical signals picked up at different points of the frequency multiplier circuit, FIG. 9 diagrammatically shows two peak limiting amplifiers coupled with a device for detection logic, FIG. 10 diagrammatically shows a computer used in the device, FIG. 11 diagrammatically shows the synchronizer, FIG. 12 shows the shape and the distribution during time of the signals picked up at the different outputs of the synchronizer, and FIG. 13 shows a device for the preselection of measuring units.

The method of this invention will be now described with reference to FIGS. 1 A, 1 B, 1 C and 2. A sustained and stable oscillator produces an oscillation of frequency $f_o$ and period $T_o$ which is used as transmission and synchronization source (FIG. 1 A). At time $t_o$, taken as time origin on the figures, a modulator gives passage to a wave train with a length $\tau = N_1 T_o$ (wherein $N_1$ is an integer).

The wave trains recurrence period $T$ is chosen of a length such that :

$$T = N T_o \quad (1)$$

wherein $N$ is a positive integer. This wave train, shown in FIG. 1 B, is in phase with the oscillator and is converted to an acoustic wave train.

The acoustic wave train, transmitted at time $t_o$, is diffused back from the submerged ground. The echo received at the receiver, after a certain time lag, is formed of a wave train as shown in FIG. 1 C, which, due to the DOPPLER effect, has a period $T'$ and a frequency $f'$ conforming with the relationship :

$$f' = f_o ( 1+[2 \rho/C]) \quad (2)$$

wherein $\rho$ is the projection on the transmission axis of the velocity vector $V$ of the vehicle with respect to the submerged ground and $C$ is the propagation velocity of the transmitted wave trains. After a time interval $T_1$, which depends on the water depth and on the velocity $V$ of the vehicle and which is defined by one of the phase coincidences between the waves at frequency $f_o$ and at frequency $f'$, the number of periods included within a time interval $\tau'$ is determined, $\tau'$ being defined between respective moments $t_1$ and $t_2$, in conformity with the relationship $$\tau' = N_2 T_o \quad (3)$$

wherein $N_2$ is a positive integer.

Curves 1 A and 1 C are generally not in phase coincidence at time $t_2$.

The number of periods determined is ( $N_3 \pm \epsilon$ ), $N_3$ being a positive integer and $\epsilon$ a fractional value between 0 and 1.

Accordingly :

$$\tau' = ( N_3 \pm \epsilon ) T' \quad (4)$$

Referring to FIG. 2 and $\beta$ being the angle of the transmission direction with respect to a vertical line and $\rho$ the projection of the velocity vector $V$ of the vehicle on said transmitting direction, then :

$$\rho = V \sin \beta \quad (5)$$

From (2) and (3), there is deduced :
$$V = (f' - f_o) C T_o/2 \sin\beta \quad (6)$$

The transmission wave length $\lambda_o$ being equal to $C T_o$, the above relationship (6), when $\beta = 30°$, becomes :

$$V = \lambda_o (f' - f_o) \quad (7)$$

thus expressing the average velocity of the vehicle during time interval $\tau'$.

The distance travelled over during said interval is :

$$E_{\tau'} = V \tau' = \lambda_o ( 1/T' - 1/T_o) \tau' \quad (8)$$

In view of relationships (3) and (4) relationship (7) becomes
$$E_{\tau'} = \lambda_o (N_3 - N_2 \pm \epsilon ) \quad (9)$$

The distance travelled over by the vehicle from time origin $t_o$, during the recurrence period $T$ is then :
$$E_T = E_{\tau'} \cdot T/\tau$$
or
$$E_T = N/N_2 E_{\tau'} \quad \text{in view of preceding relationships (1) and (3).}$$

The distance $E_T$ can be expressed as follows :
$$E_T = N/N_2 ( N_3 - N_2) \lambda_o \pm N/N_2 \epsilon \lambda_o \quad (10)$$

and, in view of relationship (9) and with the last term omitted
$$E_T \cong N/N_2 ( N_3 - N_2) \lambda_o \quad (11)$$

An important feature of the method is the digital measurement of the value of $N/N_2 ( N_3 - N_2) \lambda_o$ and the setting up thereof in a counter.

For simplification it is convenient to predetermine numbers $N$ and $N_2$ so that $N/N_2 = 2^p$ ( $p$ being a positive integer).

In view of the selected value of this ratio, the equation (10) becomes :
$$E_T \cong 2^p (N_3 - N_2) \lambda_o \quad (12)$$

Moreover the number $(N_3 - N_2)$ may be directly determined in an analogical manner (e.g. by synchroneous demodulation), amplified, reshaped and supplied to a binary register. The multiplication by $2^p$ of the number set up at the register is then effected by a mere shifting by p lines towards bits of increasing value.

It is noticeable that, whereas the choice of $T$ and $T_o$ is free, $\tau$ and $\tau'$ must, on the contrary, be such that $\tau > \tau'$.

The relationship (10) may be written as follows :
$$E_T = N/N_2 (N_3 - N_2) [ 1 \pm \epsilon/(N_3 - N_2) ] \lambda_o$$

The term $\epsilon/(N_3 - N_2)$ will be hereinafter defined as the intrinsic accuracy factor indicated by $F$. In view of the preceding relationships 3, 4 and 7 (case where $\beta = 30°$), the factor $F$ may be written :

$$F = (\epsilon T_o/\tau') \cdot C/V \text{ or } F = (\epsilon/N) \cdot (C/V) 2^p$$

The accuracy of the measurement, which is in inverse proportion to factor $F$ is the better when the time interval $\tau'$ is the longer. It is apparent that the accuracy depends on the value of $N$ and on the velocity of the vehicle.

In order to decrease the value of the accuracy factor $F = \epsilon/(N_3 - N_2)$ as the water depth decreases, it is necessary either to increase $N_3 - N_2$ or to decrease $\epsilon$. In view of (2) and (3) above it is clear that for increasing $(N_3 - N_2)$, $\tau'$ must be increased up to a maximum value compatible with the water depth, or the pilot frequency $f_o$ must be increased. The last condition, which is fulfilled when transmitting waves at harmonics of frequency $f_o$, is compatible with the variation law of the penetration distance in term of the frequency. It implies however a double limitation, that of using transducers with a very wide operating band width and that of requiring frequent changes of the transmitting frequency ranges when the vehicle is displaced over low water depths.

Accordingly it is preferred to make use of a steady transmission frequency $f_o$, penetrating to a great water depth, and to decrease the value of $\epsilon$. Wave trains at a steady frequency $f_o$ are therefore transmitted and at the stage of receiving the back-diffused waves, the actual frequency shift between the transmitted and the received waves is multiplied by a factor $2^n$, for example. As a result therefrom the number of cycles $(N_3-N_2)$, measured during the time interval $\tau'$, will be multiplied by a factor $2^n$. In fact the result is the same as that obtained by dividing $\epsilon$ by $2^n$.

This stage of multiplying by $2^n$ the frequency shift is however optional and is only to be used when a high accuracy is desired. In this respect the embodiment is described in a non-limitative manner.

FIG. 3 shows the location of the transducers forming the transmitting-receiving device with respect to the axis of the vehicle. The three transducers have their radiation axis respectively oriented symmetrically with respect to the rolling and pitching axis and to the vertical axis of the moving body.

The directions $OX_1$, $OX_2$, $OX_3$ are inclined by the same angle $\gamma$ with respect to the vertical line $OZ$.

The respective three planes containing $OZ$ and respectively $OX_1$, $OX_2$ and $OX_3$ form the same angle $\alpha$ with respect to the rolling axis.

As it will be further explained with reference to FIG. 4, the back-diffused signals arriving along these three directions will be admixed by pairs, i.e., $OX_1$ with $OX_2$ and $OX_1$ with $OX_3$.

This arrangement provides for a good compensation of the parasitic effects of the rolling and the pitching. It also provides for a good compensation of the slope of the ground, irrespective of the direction of the inclination with respect to the axes of the vehicle.

For a greater convenience $\alpha$ may be given the value of 45°, the transmission axes being arranged along the three edges of a square base pyramid. The arrangement shown on the figure for axes $OX_1$, $OX_2$ and $OX_3$ is not limitative. More generally these axes may be oriented along any three edges of the pyramid.

The transducers will be used both for transmission and reception; they will consist for example of a plurality of reversible piezoelectric vibrators. The method has been explained, for simplification purpose, with reference to FIG. 2 wherein angle $\beta$ has been chosen equal to 30°.

In the embodiment of FIGS. 3 and 4, three transducers are used as well as a demodulator of the reflected signals, wherein the frequencies of the signals arriving along $OX_1$ and $OX_3$ on one hand and those arriving along $OX_1$ and $OX_2$ on the other hand are subtracted. The frequency shifts between the frequencies of the transmitted waves and those of the received waves, as detected along axes $OX_1$, $OX_2$ and $OX_3$ are proportional to the projection of the vector of the vehicle velocity on said axes and consequently proportional to sin $\gamma$. Angle $\gamma$ will thus be given the value for which relationship (12) can be used without change.

FIG. 4 diagrammatically shows the general arrangement of a device for performing the method of the invention. It comprises essentially a synchronizer 1, three transducers 5a, 5b, 5c and form assemblies $E_1$, $E_2$, $E_3$ $E_4$.

Synchronizer 1 generates sine voltages at a pilot frequency $f_o$ and its even multiples as well as signals for coordinating the different operations performed by the device. The assembly $E_1$, from a voltage at a frequency $f_o$ and orders from the synchronizer, generates and amplifies wave trains which are radiated, in the form of acoustic waves trains, towards the submerged ground, through transducers 5a, 5b and 5c. The acoustic wave trains, after back diffusion from the submerged ground, are converted to electrical voltages which are supplied to assembly $E_2$, wherein is performed the demodulation of the back diffused waves, the detection of the frequency shifts thereof with respect to the transmitted waves, by pairs, the multiplication by $2^n$ of said frequency shifts and the conversion to pulses of the resulting signals. The assembly $E_3$ comprises a computer which, on the basis of said pulses and orders from the synchronizer, determines the distance travelled over by the vehicle, using the relationship (12).

Finally, the assembly 4, formed of preselection units, sign logic apparatus and adding and substracting binary counters, provides a representation of the distance travelled over and of the moving direction in conventional units.

FIG. 5 shows more in detail the elements forming the assemblies $E_1$, $E_2$, $E_3$ and $E_4$ of FIG. 4.

The assembly $E_1$ works as follows :

A modulator 2 receives from a synchronizer 1, described below, on the one hand a sine voltage at frequency $f_o$ and, on the other hand, two successive orders in the form of pulses defining moments $t_o$ and $t_3$ (FIG. 1). During the time interval $$\tau = t_3 - t_o = N_1 T_o$$

the modulator gives passage to a wave train at frequency $f_o$.

The modulator output feeds three separate amplifying channels referred to as $a$, $b$ and $c$, each comprising a power pre-amplifier 3 and an amplifier 4. The three amplifiers 4a, 4b, 4c feed respectively three transmitting transducers 5a, 5b, 5c each of which transmits, during the time interval $\tau$, an ultrasonic wave train at frequency $f_o$. The same three transducers, operating in a reversible manner, pick up the signals diffused back from the submerged ground.

The electric voltages generated thereby are supplied to receiver $E_2$.

Let $\omega_o$ be the pulsation of the transmitted waves and respectively $\omega_o + \Omega_1$, $\omega_o + \Omega_2$, $\omega_o + \Omega_3$ the pulsations of the reflected waves received at transducers 5a, 5b and 5c,$\Omega_1$, $\Omega_2$, $\Omega_3$ being the deviations between the pulsations of the transmitted signals and the pulsations of the signals respectively received along axes $OX_1$, $OX_2$, $OX_3$.

The receiving assembly $E_2$ operates as follows :

The three transducers 5a, 5b, 5c feed respectively three amplifiers 6a, 6b, 6c, acting as band pass filters. The amplitudes of their output signals have the respective forms :

$E_1 \cos ( \omega_o + \Omega_1 ) t$
$E_2 \cos ( \omega_o + \Omega_2 ) t$
$E_3 \cos ( \omega_o + \Omega_3 ) t$ the output signal of amplifier 6a feeds a frequency converter 7, further receiving from synchronizer 1 a sine voltage at frequency $f_o$. The converted multiplies the two voltages by each other and removes the low frequency component. The output voltage, having the form $E_1 \cos(2\omega_o + \Omega_1)t$ feeds four frequency converters 10a, 10b, 10c and 10d. The outputs of amplifiers 6b and 6c are connected to converters 10a and 10b directly and to converters 10c and 10d through $\pi/2$ phase shifters 8 and 9 respectively.

The converters 10a, 10b, 10c, 10d give the products of the input voltages and remove the high frequency components.

Their output voltages will be respectively:

$E_1E_2/2 \cos(\omega_o + \Omega_1 - \Omega_2)t$
$E_1E_2/2 \sin(\omega_o + \Omega_1 - \Omega_2)t$
$E_1E_3/2 \cos(\omega_o + \Omega_1 - \Omega_3)t$
$E_1E_3/2 \sin(\omega_o + \Omega_1 - \Omega_3)t$ These voltages feed respectively four frequency multipliers, respectively 11a, 11b, 11c, 11d, multiplying the input signals frequencies by a factor $2^n$ ($n$ being an integer).

Their output voltages are consequently:

$E_1E_2/2 \cos 2^n(\omega_o + \Omega_1 - \Omega_2)t$
$E_1E_2/2 \sin 2^n(\omega_o + \Omega_1 - \Omega_2)t$
$E_1E_3/2 \cos 2^n(\omega_o + \Omega_1 - \Omega_3)t$
$E_1E_3/2 \sin 2^n(\omega_o + \Omega_1 - \Omega_3)t$ Four frequency converters 12a, 12c, 12b, 12d are respectively supplied on the one hand, with the output voltages of respective multipliers 11a, 11c, 11b, 11d and, on the other hand, with a voltage at frequency $2^n f_o$ from synchronizer 1.

These converters multiply the input signals and remove the high frequency components.

Their output voltages will be respectively:

$E_1E_2/2 \cos 2^n(\Omega_1 - \Omega_2)t$
$E_1E_2/2 \sin 2^n(\Omega_1 - \Omega_2)t$
$E_1E_3/2 \cos 2^n(\Omega_1 - \Omega_3)t$
$E_1E_3/2 \sin 2^n(\Omega_1 - \Omega_3)t$ The converters 12a, 12c, 12b and 12d are respectively connected to four peak limiting amplifiers 13a, 13c, 13b, 13d.

These are operational amplifiers, working in saturation condition, which convert the received sine voltages to rectangular waves. Each of them has two symmetrical outputs providing oppositely phased signals.

The amplifiers 13a, and 13c on the one hand, 13b and 13d on the other hand control two detection logic circuits, 14 and 15 respectively, which supply, as described below, adding or substracting pulses from two outputs, ($C_1D_1$) and ($C_2D_2$) respectively, to two digital computers 16a and 16b forming the assembly $E_3$, which perform the operation $E = N/N_2 (N_3 - N_2) \lambda_o$ with an accuracy defined by factor $F = \epsilon/2^n/(N_3 - N_2)$.

Each computer 16a or 16b controls, through two conductors, one for adding and the other for substracting, a unit preselector (17a or 17b) setting in conventional units (meters or fathoms) the distance travelled over, previously determined in term of $\lambda_o$ (see description of FIG. 3).

The preselector 17a and 17b each feed, through two conductors, two sign logic devices, respectively 18a and 18b which finally control, each through two conductors, two binary adding and substracting counters, respectively 19a and 19b.

These devices 18a and 18b are used for setting up the sign of the first pulse arriving at the counters (adding or substracting pulses) when reset after passage of the vehicle at a determined location. As a matter of fact, when the first pulse is a substracting pulse, the counter will indicate its maximum binary capacity II ... I .

For a more convenient reading it is preferred in such circumstance to have set number 1, i.e., binary number 00 ... 01 with a negative sign. This is performed by means of devices 18a and 18b via channels $C_1$, $C_2$, $D_1$, $D_2$, followed by the pulses from computers 16a, 16b, through preselection units 17a and 17b, and selected by output programmers included in said operators.

FIG. 6 shows an arrangement of amplifier of the type used at the input of the receiving assembly $E_2$, having reference 6. It comprises essentially an input transformer for adapting the input impedance to that of the transducers, a device for sheltering the amplifiers during the transmission period, and three operational amplifiers in series, the first one providing for the necessary gain, the two others forming a band pass filter with 12 db/octave. The primary of transformer 20 is coupled to one of the transducers 5. The input of amplifier 24 is connected respectively to the secondary through resistor 21 and to a pair of symmetrical outputs of a flip flop circuit 23, through two identical diodes 22a and 22b mounted in opposite directions with respect to each other.

The assembly of the two dides and resistor 21 forms a voltage divider. Flip flop 23 is controlled, through conductors 23a and 23b, by synchronizer 1. Let R' and R'' be the dynamical resistances of said diodes, respectively in the forward and reverse directions, and U and U' the respective voltages at the secondary output and at the input of amplifier 24. At moment $t_o$ of the beginning of the transmission, the flip flop 23 is placed by the synchronizer in such a condition that its outputs provide a voltage which polarize the diodes in the conducting direction. The assembly of the two diodes is thus equivalent to a resistance R' much smaller than the resistance of resistor 21. It results that voltage U' is much smaller than U. At moment $t_1$ of the beginning of counting, the flip flop 23, controlled by the synchronizer, polarizes diodes 22a and 22b respectively at voltages $-U_o$ and $+U_o$. When voltage U is higher than $U_o$, the assembly of diodes 22a and 22b is equivalent to a resistance R' and when U is lower than $U_o$ this assembly is equivalent to a resistance R'' much higher than that of resistor 21. In the first case U' is very low, in the second case U' is substantially equal to $U - U_o$. Starting from time $t_1$, only the voltages of a modulus lower than $U_o$ will be supplied to the amplifiers. A new cycle begins at time $t_o + T$.

The output voltage of amplifier 24 is supplied to amplifier 29, which, in co-operation with resistors 25 and 27 and capacitors 26 and 28, acts as a low-pass filter. The assembly formed by amplifier 34, downstream amplifier 24 with respect to the current direction, resistors 31 and 33 and capacitors 30 and 32, acts as a high pass filter. Both filters are equivalent to a band pass filter.

FIG. 7 illustrates an embodiment of a frequency multiplier such as those indicated in FIG. 5 by references 11a, 11b, 11c and 11d. For simplification purpose a multiplier by two will be described with reference to FIG. 8 showing the shapes of the electric signals at various points of the circuit. Let $f$ be the frequency of an input signal of the amplifier. Said signal feeds two operational amplifiers 36 and 37 working in saturation condition. Each of these amplifiers has two symmetrical outputs and provides two rectangular waves in phase opposition. Amplifier 36 amplifies and limits the peaks of the input signal and provides at its output two rectangular signals such as $g_1$ and $g_2$ in FIG. 8. Amplifier 37 integrates, amplifies and limits the peaks of the input signal and provides two rectangular signals such as $h_1$ and $h_2$ in FIG. 8. Signals such as $g_1$, $g_2$, $h_1$, $h_2$ respectively pass through differentiating circuits 38a, 38b, 38c and 38d which convert the same to pulses as $i_1$, $i_2$, $j_1$ and $j_2$ of FIG. 8. The outputs of the four differentiating circuits 38a, 38b, 38c and 38d are connected to the input of an operational amplifier 40 through four diodes respectively referenced 39a, 39b, 39c and 39d. The output of amplifier 40 controls a flip flop circuit 41.

Due to the diodes 39, only the positive pulses are supplied to amplifier 40. It is easy to understand that the transmitted pulses (line k of FIG. 8) will follow one another at a recurrence frequency which is four times that of the pulses shown on any of lines $i_1$, $i_2$, $j_1$, $j_2$ of FIG. 8.

The flip flop 41, sequentially operated by each one of the successive pulses, produces a voltage in the form of rectangular waves (see last line of FIG. 8) with a frequency which is twice that feeding the input 35.

The multiplication of a signal frequency by $2^n$ would be performed in a similar way by using $n$ multipliers of the above-described type connected in series.

FIG. 9 shows two amplifiers such as 13a and 13c connected to a detection logic circuit, such as 14 (FIG. 5).

The two operational amplifiers work in saturation condition and each of them has two symmetrical outputs providing two rectangular wave voltages in phase opposition.

Let $\cos \omega t$ and $\sin \omega t$ be the representative functions of the input voltages, respectively of amplifiers 13a and 13c. The signal from output 42a is sent to two "AND" gates 45 and 46. The output signals 42c and 42d are sent, after passage through two differentiating circuits 44a and 44b, respectively to gates 45 and 46.

In the case of the assembly 13a, 13c, 14 of FIG. 9, when $(\Omega_1 - \Omega_2)$ is positive the gate 45 will give passage to an adding pulse. In the opposite case a substracting pulse will pass through gate 46.

The computing device of FIG. 10, corresponding to assembly $E_3$ of FIG. 4, comprises two binary adding and substracting counters connected in series, a first one 48 with $n$ bits for fractional numbers and the other 49 with $m$ bits for whole numbers, a binary substracting register with $(m + p)$ bits for whole numbers and a logic assembly including an output programmer, ensuring the synchronization of the inputs and outputs. The programmer is formed of "AND" gates 53a, 53b, 54a, 54b, 59, 60, "OR" gates 55 and 56 and a flip flop 47.

The input C is connected to gates 53a and 54b, the input D to gates 53b and 54a. The output terminal Q of flip flop 47 is connected to gates 54a, 54b, and 67 and the output terminal $\overline{Q}$ to gates 53a, 53b and 66. The flip flop 47 is energized through two AND gates 59 and 60, respectively controlled by inputs C and D on the one hand and an AND gate 64 on the other hand. This latter gate, connected to register 50, also energizes one of the inputs of a flip flop 51, the other input of which is controlled by a conductor with the reference $W_1$ connected to synchronizer 1. A gate 63 is controlled by the output terminal Q of flip flop 51, by a conductor with the reference $W_3$ connected to the synchronizer 1, and by an inverter 52 placed downstream gate 64. The output of gate 63 is connected to register 50 and to gates 66 and 67. The AND gates 53a, 54a on the one hand, 53b, 54b on the other hand, control, through two OR gates 55 and 56, two AND gates respectively 57 and 58 whose outputs are connected to the inputs C and D of the adding and substracting counter 48.

The conductor with reference "$\tau'$," connected to the synchronizer, controls on the one hand two gates 57 and 58 and, on the other hand, one AND gate 61. Gate 61 is also controlled by the adding and substracting counter 49 and connected to register 50. An AND gate 62, controlled through two conductors with references $W_2$ and $W_3$ is connected through its output to register 50. A conductor with reference RAZ provides through one OR gate 65, for the zero adjustement, at the end of each measuring cycle, of the counter for whole numbers 49 and of register 50.

Finally, a conductor 79, connected directly to the counter 48 for fractional members on the one hand, to the counter 49 and to register 50 through one OR gate 65, on the other hand, ensures their zero adjustement at the initial moment of beginning the operations.

The calculating device works as follows:

The adding and substracting counter 49 and register 50 being at zero position the gate 64 is opened, the voltage at the output terminal of flip flop 51 is zero and gate 63 is blocked by inverter 52. The starting pulse of the counting period $\tau'$ makes possible the opening of gates 57, 58 and 61.

At the arrival of the first pulse through the adding input C, gate 59 opens and triggers the flip flop to such a state that the voltages at terminals Q and $\overline{Q}$ are respectively 0 and 1. Gates 53a, and 53b, controlled through terminal $\overline{Q}$, are the only ones which may open. Gates 54a, and 54b, controlled through terminal Q, are blocked. The adding input C controls, through gates 53a, 55 and 57 the input C of the counters, the substracting input D controls through gates 53b, 56, 58, the input D of the counters. Nc and Nd being respectively the number of adding and substracting pulses, the counters will indicate the difference $Nc - Nd$.

Conversely if the first pulse is supplied to the substracting input D, the gate 60 opens and triggers the flip flop 47 to such a state that voltages at terminals Q and $\overline{Q}$ are respectively 1 and 0. For the same reasons as before, only the gates 54a, 54b may be opened. The inputs C and D control, respectively through gates 54b, 56, 58 and gates 54a, 55, 57, the inputs D and C of the counters. These counters will then be set to $Nd - Nc$.

This channel selection is repeated at each time when the register passes again to a zero value.

Gate 61 being open, the whole part of number $|Nc - Nd|$ is transferred to register 50.

The first pulse transferred to the register closes gate 64 and blocks the flip flop 47 on its position. The gate 63, through inverter 52 is released. At time $t_2$, ending the counting interval $\tau'$, a rectangular signal of a length $pT_0$, supplied through the the conductor $W_2$ opens gate 62. A number $p$ of clock pulses, at the recurrence frequency $f_0$, shifts by $p$ lines towards bits of increasing values, the figure contained in the register, thereby multiplying by $2^p$ the whole part of $|Nc - Nd|$. At the moment $(t_2 + pT_0)$ of the end of the shift, a pulse supplied from the conductor $W_1$ triggers the flip flop 51 to such a state that the voltage at terminal Q is 1. The gate 63 gives passage to clock pulses until complete emptying of the register, opening gate 64 and closing gate 63 by means of inverter 52.

According to the channels selected by the commutating switch these pulses will issue from "adding" gate 66 or "substracting" gate 67. In other words, when $Nc - Nd > 0$, $Nc - Nd$ pulses will issue from $C$ and when $Nc - Nd < 0$, $|Nc - Nd|$ pulses will issue from $D$.

The synchronizer diagrammatically shown in FIG. 11, corresponding to element 1 of FIG. 4, will be described with reference to FIG. 12. It comprises a Wien bridge oscillator which produces a signal at frequency $2^n f_o$ (diagram $e$ of FIG. 12, for which $n$ is chosen equal to 1). This oscillator feeds a counter 69 whose output is connected to the input and which accordingly works as a divider. This counter produces at a preselected output at a counting value of $2^n$ units, a signal at frequency $f_o$ (diagram $f$ of FIG. 12) which is used for the transmission.

A signal at frequency $2^{k_1} f_o$ ($k_1$ being an integer lower than $n$) is picked up at one of the outputs and feeds, through an AND gate 70, opened through a releasing conductor 79 at the starting time, a counter 71 with a capacity of N whose output is connected to the input. The preselected output at the counting value $N_1$ generates a pulse defining time $t_3$ (diagram $n$ of FIG. 12). A signal at the frequency $2^{k_1} f_o / N$ is picked up at the output and passes through a third counter 72 having a capacity of $2^{k_2}$ ($k_2$ being an integer between 0 and $n$) whose output is connected to the input. Pulses at the frequency $2^{k_1} f_o / N \cdot 2^{k_2}$ follow one another with a period $NT_o$ and define moments $t_o$ of the beginning of each recurrence period (diagram g of FIG. 12).

Two identical counters 74 and 77, each used on one of the two measuring channels, are fed with the signal at frequency $f_o$ issuing from counter 69, through two AND gates 73 and 76. Said gates 73 and 76 are respectively opened only when the oscillations with the pulsations $\Omega_1 - \Omega_2$ and $\Omega_1 - \Omega_3$, picked up at the output of converters 12 are present, i.e., at moment $t_1$ (diagram $i$ of FIG. 12). The initial pulses, at the opening of the gates, define time $t_1$ and are also used for controlling the automatic zero adjustment (RAZ) of the counters of the computer at the beginning of each counting cycle.

Gates 73 and 76 respectively control two flip flop circuits 75 and 78. Counters 74 and 77 record, from time $t_1$, the pulses at frequency $f_o$. They each have a first and second respectively outputs preselected to counting values $N_2$ and $(N_2+p)$. The first output issues a pulse defining time $t_2$ (diagram $j$ of FIG. 12 wherein $N_2 = 1$), the second a pulse defining time $t_2 + pT_o$ (diagram $k$ of FIG. 12, wherein $p = 2$). The output terminals, preselected at the value $N_2$, of counters 74 and 77 are respectively connected to two other inputs of the flip flop circuits 75 and 78.

The flip flop circuits are controlled by the pulses generated at times $t_1$ and $t_2$. A signal of a length $\tau'$, defining the counting time interval, is obtained at their outputs (diagram 1 of FIG. 12). In order to improve the liability of the results and make them independent from any parasitic signals, the opening of gates 73 and 76 will be controlled through AND gates 79 and 80, each having several inputs. The opening of gate 73 will be obtained for example by the simultaneous presence (coincidence) at gate 79 of signals with pulsations $\omega_o + \Omega_1$, $\omega_o + \Omega_2$, $\omega_o$ and $\Omega_1 - \Omega_2$ picked up from the receiving circuit. The opening of gate 70 will be obtained for example by the simultaneous presence (coincidence) at gate 80 of signals with pulsations $\omega_o + \Omega_1$, $\omega_o + \Omega_3$, $\Omega_o$ and $\Omega_1 - \Omega_3$, picked up from the receiving circuit. A further input (ES), controlled by an echo sounder (not shown) may be added at each of gates 79 and 80.

The preselector of FIG. 13, having reference 17 on FIG. 5, comprises two "adding-substracting" counters with two inputs 79 and 80, having outputs preselected at the respective counting values $q_1$ and $q_2$. Each one has one input connected to the "adding" conductor C and the other connected to the "substracting" conductor D. Inputs C and D are directly connected to the outputs of the preselector, respectively through conductors 81a and 81b. The output terminals $82_a$ and $83_a$ of counters 79 and 80 are respectively connected to the output terminals referred to as $C/q_1$ and $C/q_2$ where the number of adding pulses available is divided by $q_1$ and $q_2$ respectively. The output terminals 82b, 83b of counters 79 and 80 are connected to the output terminals referred to as $D/q_1$ and $D/q_2$ where the number of substracting pulses available is divided by $q_1$ and $q_2$ respectively. These outputs are connected to a three-ways commutator 84 whereby can be selected one of the three couples of values ($C$ and $D$ or $C/q_1$ and $D/q_1$ or still $C/q_2$ and $D/q_2$).

It is then possible to set up the distance travelled over either in $\lambda_o$ units with the best possible resolution achievable by the device, or in meters or in fathoms.

When the selected unit is the meter, $q_1$ will be given such a value that $q_1 \lambda_o = 1m$. When the selected unit is the fathom, $q_2$ will be given such a value that $q_2 \lambda_o = 1.852$ m (value of the fathom expressed in meters), $\lambda_o$ being the transmission wave length.

From the foregoing description one skilled in the art can easily ascertain the essential characteristics of this invention, and without departing from the spirit and scope thereof, can make various changes and modifications of the invention to adapt it to various usages and conditions. Consequently, such changes and modifications are properly, equitably and intended to be within the full range of equivalence of the following claims.

I claim:

1. A method for measuring the distance travelled by a vehicle moving in water with respect to the submerged bottom wherein recurring intermittent acoustic signals at a predetermined frequency are transmitted along at least one direction inclined with respect to the bottom and echo signals are received along the same direction, comprising:
    a. measuring during a time interval maintained smaller than the direction of the echo signals, the difference between accrued whole numbers of periods respectively of the transmitted signals and of the echo signals, and
    b. determining therefrom by calculation in a binary digital form the distance travelled by the vehicle during a time interval equal to the recurrence period of the intermittent transmitted signals as a value proportional to the difference between the accrued whole numbers of periods and to the ratio of the period numbers of a signal at the transmitting frequency, contained respectively in the recurrence period of transmission and in the measuring time interval.

2. A method according to claim 1 wherein the ratio is a positive whole power of number two.

3. A method according to claim 1 comprising multiplying before the measuring step the difference between the accrued whole number of periods with a predetermined factor so as to divide by the same factor the relative error in the measured value of the distance.

4. A method for measuring the distance travelled by a vehicle moving in water with respect to the submerged bottom wherein intermittent acoustic signals at a predetermined frequency are transmitted along three directions inclined with respect to the bottom and arranged as three edges of a pyramid with a rectangular base whose sides are parallel to the longitudinal and transversal axes of the vehicle, and echo signals are received along the same direction comprising:
  a. a measuring during a time interval maintained smaller than the duration of the echo signals the difference between accrued whole numbers of periods of the signals received along one direction and respectively the signals received along the other direction, and
  b. determining therefrom by calculation in a binary digital form, the distance travelled by the vehicle along two displacement directions contained in two planes passing through said three axes and during a time interval equal to the recurrent period of the intermittent transmitted signals as a value proportional to the difference between the accrued whole numbers and to the ratio of the numbers of periods of a signal at the transmitting frequency contained respectively in the recurrence period and in the time interval.

5. A device for measuring the distance travelled by a vehicle moving in water with respect to the submerged bottom comprising means for generating intermittent electric signals at a predetermined frequency, means for transmitting said signals in the form of recurrent acoustic waves along at least two transmission axes inclined by the same angle with respect to the bottom, means for converting to electric signals the acoustic waves received along said axes, means for amplifying the received signals, means for combining the amplified signal, received along one of the axes, taken as reference direction and of which frequency is used as reference frequency, with the signals received along the other axes, thereby producing signals at frequencies proportional to the difference between the frequencies of the signals received along said reference direction and along the other axes, means for converting to pulses the signals generated by said combining means, means for counting said pulses during a determined time interval, maintained smaller than the duration of the received acoustic waves, means for determining by binary digital computation, directly in magnitude and sign, from said pulses, the distance travelled by the vehicle during the recurrence period of transmission, along at least one direction of displacement in a plane containing said two axes, in multiplying the number of pulses by a value proportional to the ratio of the numbers of periods of a signal at the transmission frequency contained respectively in the recurrence period and in the time interval and means for synchronizing the performed operations.

6. A device according to claim 5 wherein the combining means produces signals at a frequency equal to the product of the difference between the respective frequencies of the received wave trains and the transmitted wave trains, by factor $2^n$, n being a positive integer and the means for computing the distance comprises two adding-subtracting binary counters coupled in series one of which has n bits.

7. A device according to claim 5 wherein the means for combining produce two signals at frequencies equal to the product of said frequency differences by the same factor $2^n$, n being a positive integer, and the computation means comprise two binary adding-subtracting counters coupled in series, one of which has n bits.

8. A device according to claim 7 wherein the means for converting to pulses the signals generated by the combining means includes means for switching the pulses providing said pulses on an addition output or on a subtracting output according to the difference between the frequencies of the signals received is positive or negative, and wherein each computation means comprises two adding-subtracting binary counters, coupled in series, one with n bits for fractional numbers, the other with m bits for whole numbers, a binary register with $(m + p)$ bits an assembly of logic elements comprising a first AND gate and a second AND gate connected to the adding output of the switching means, a third AND gate and a fourth AND gate connected to the subtracting output thereof, a fifth and a sixth AND gate, whose outputs are respectively connected to an adding input and to a subtracting input of the adding-subtracting counter with n bits and a seventh AND gate, said last three AND gates being controlled during the measuring time interval by a signal generated by the synchronizing means, the fifth and sixth AND gates being controlled respectively by the first and the fourth AND gates, through a first OR gate and by the second and third AND gates through a second OR gate, the seventh AND gate being also controlled by the adding-subtracting counter with m bits and having its output connected to register, an eighth and a ninth AND gate the inputs of which are respectively connected to the adding and subtracting outputs of the switching means and controlled by a tenth AND gate opened by the reset of the register, first flip-flop circuit controlled by the eighth and ninth AND gates whose symmetrical outputs trigger, respectively, one the second and fourth AND gates, the other the first and third AND gates, an eleventh AND gate with three inputs whose output is connected to the register and also to a twelfth and a thirteenth AND gate, one of these two latter AND gates being actuated by one of the outputs of the first flip-flop circuit and the other by the other output of the same flip-flop circuit, said eleventh AND gate being actuated simultaneously by the tenth AND gate, through an inverter, by pulses at the frequency $f_o$ generated by the synchronizing means and by the outputs of a second flip-flop circuit, the latter being actuated by the tenth AND gate and by an input connected to the synchronizing means for the emptying of the register after achievement of the computation, a fourteenth AND gate whose output is connected to the register and whose inputs are respectively supplied, one with pulses at frequency $f_o$, the other with releasing pulses emanating from the synchronizing means, a conductor for control of manual reset, connected to the adding-subtracting counter with $n$ bits, a third OR gate actuated either by pulses controlling manual reset or by pulses for automatic reset at the end of each computation cycle, emanating from the synchronizing means and whose output is connected to the adding-subtracting counter with m bits and to register and two output channels, one for adding, the other for subtracting, respectively connected to the outputs of the twelfth and thirteenth gates.

9. A device according to claim 8 wherein the second and third gates of the synchronizing means are controlled through two gates with several inputs connected to several different points of the circuits of the device.

10. A device according to claim 7 wherein the synchronizing means comprise an oscillator generating oscillations at frequency $2^n f_o$, a first counter means connected to the oscillator, providing at a first output a signal at a frequency $f_o$ and at a second output a signal at frequency lower than that of the oscillation generated by the oscillator, a second counter means connected to the second output of the first counter means through a first AND gate actuated at a starting time by a releasing pulse said second counter means supplying, at a first preselected output, pulses indicating the end of the transmission of the intermittent acoustic signals and at a second output a signal at a frequency lower than that of the signal received from the first counter means, providing at one output, pulses indicating the beginning of the transmission of intermittent signals, a second and a third AND gate receiving from the first counter means a signal at frequency $f_o$, the first one controlled through at least one signal at a frequency equal to the difference between the frequency of the waves received along the reference axis and that of the waves received along a second axis, the second one through at least one signal at a frequency equal to the difference between the frequency of the waves received along the reference axis and that of the waves received along a third axis, the outputs of which directly provide pulses indicating the beginning of the operation of counting the difference betwen the accrued numbers of cycles and the reset of the counters of the computing means, said outputs being connected, the first to the input of a fourth means, the second to the input of a fifth counter means, the fourth and the fifth counter means each having a first preselected output producing pulses indicating the end of said counting operation, a second preselected output, producing pulses indicating the end of a computation period, a first flip-flop circuit connected to the input and the first preselected output of the fourth counter means, a second flip-flop circuit connected to the input and to the first preselected output of the fifth counter means, said flip-flop circuits generating at their outputs pulses defining the measuring time interval.

11. A device acccording to claim 5 wherein the transmission means and the converting means for the waves along each axis comprise a transmitting and receiving transducer and the amplification means comprise circuits isolating the amplification means during the transmission of acoustic waves.

12. A device according to claim 11 wherein each isolating circuit comprises a transformer whose primary is connected to said conversion means and whose secondary is connected to a voltage divider formed of a resistor connected to two diodes mounted in parallel and in opposite directions with respect to each other, whose dynamic resistances in the forward and reverse directions are respectively much lower and much higher than that of resistor, said diodes being connected to polarizing means in the forward direction during the transmission time interval of the intermittent signals and in the reverse direction during said time interval.

13. A device according to claim 7 wherein the combining means comprise a first frequency converter for mixing the signal at the reference frequency with a signal at the transmitted frequency produced by the synchronizing means, second and third frequency converters for mixing the signal issued from the first converter respectively with the signal received along a second axis and with the same signal phase shifted by 90°, fourth and fifth converters for mixing the signal issued from the first converter respectively with the signal received along a third axis and with the same signal phase shifted by 90°, four frequency multipliers for multiplying the frequencies of the signals issued from the second through fifth converters by $2^n$ and four frequency converters for mixing the signals issued from the multipliers respectively with a signal whose frequency is that of the transmitted frequency multiplied by $2^n$.

14. A device according to claim 13 wherein the frequency multiplier by $2^n$ comprises n multiplying units in series, each of which includes two parallel chains connected to the same input, one of them comprising a first peak limiting operational amplifier with two oppositely phased outputs, the other chain comprising a second integrating and peak limiting operational amplifier with two oppositely phased outputs, four differentiating circuits for converting to pulses the peak limited signals, each of them being connected to one of the four outputs of the two amplifiers, four diodes each mounted downstream from one of the differentiating circuits with respect to the current direction, a third operational amplifier means the input of which is connected to the outputs of said four diodes, and a flip-flop circuit connected to the output of the third amplifier, producing a signal at twice the frequency of the input signal.

15. A device for measuring the distance travelled by a vehicle moving in water with respect to the submerged bottom comprising means for generating intermittent electric signals at a predetermined frequency, means for transmitting said signals in the form of recurrent acoustic waves along three transmission axes inclined by the same angle with respect to the bottom, means for converting to electric signals the acoustic waves received along said axes, means for amplifying the received signals, means for combining the amplified signal, received along one of the axes, taken as reference direction and of which frequency is used as reference frequency, with the signals received along the other axes, thereby producing signals at frequencies proportional to the difference between the frequencies of the signals received along said reference direction and respectively along the other axes, means for converting to pulses the signals generated by said combining means, means for counting said pulses during a time interval, maintained smaller than the duration of the received acoustic waves, means for determining by binary digital computation, directly in a magnitude and sign, from said pulses, the distance travelled by the vehicle during the recurrence period of transmission, along two directions of displacement contained in two planes passing through said axes in multiplying the numbers of pulses by a value proportional to the ratio of the numbers of periods of a signal at the transmission frequency contained respectively in the recurrence period and in the time interval and means for synchronizing the performed operations.

* * * * *